United States Patent
George

[11] 3,942,861
[45] Mar. 9, 1976

[54] FULL VIEW HOLOGRAM
[75] Inventor: Nicholas George, Pasadena, Calif.
[73] Assignee: California Institute of Technology, Pasadena, Calif.
[22] Filed: Mar. 22, 1974
[21] Appl. No.: 453,642

Related U.S. Application Data
[63] Continuation of Ser. No. 36,779, May 13, 1970, abandoned.

[52] U.S. Cl. .................................... 350/3.5; 355/2
[51] Int. Cl.² .................... G03H 1/28; G03H 1/20
[58] Field of Search .......................... 350/3.5; 355/2

[56] References Cited
UNITED STATES PATENTS

| | | | |
|---|---|---|---|
| 3,532,406 | 10/1970 | Hartman | 350/3.5 |
| 3,582,176 | 6/1971 | Mathisen | 350/3.5 |
| 3,632,182 | 1/1972 | Sincerbox | 350/3.5 |
| 3,758,186 | 9/1973 | Brumm | 350/3.5 |

*Primary Examiner*—Ronald J. Stern
*Attorney, Agent, or Firm*—Lindenberg, Freilich, Wasserman, Rosen & Fernandez

[57] ABSTRACT

A single flat sheet hologram is provided which when illuminated displays substantially a 360° view of an object space. This is done by recording both left and right hand views of the object space on the single sheet of sensitive material.

A flat sheet hologram composed of two emulsions, one recording the left side view and the other the right side view is also claimed. The views on these two holograms are coordinated so as to fix the corresponding points in space.

9 Claims, 13 Drawing Figures

INVENTOR
NICHOLAS GEORGE
BY
ATTORNEYS

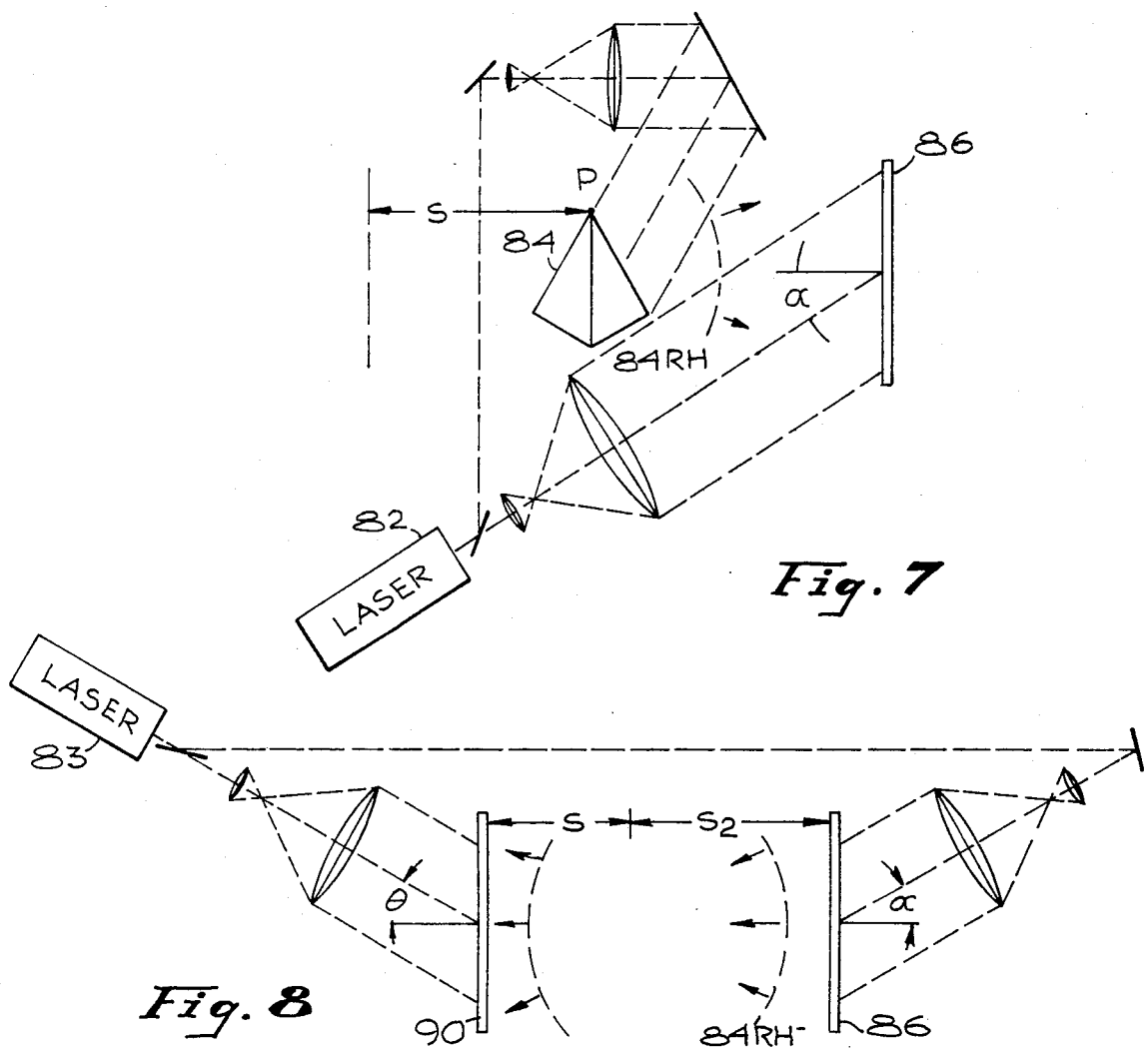
Fig. 7
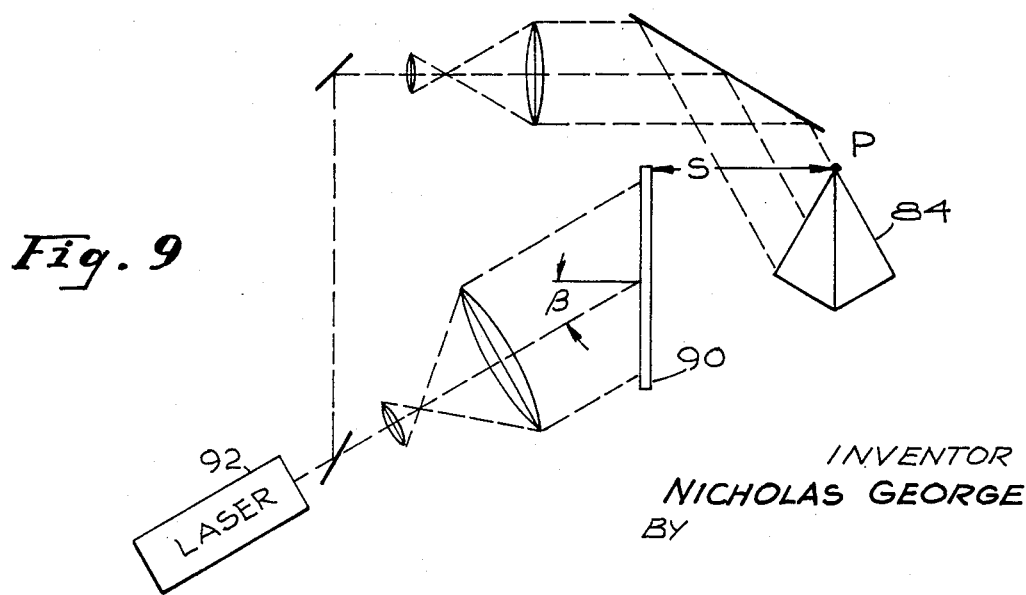
Fig. 8
Fig. 9
INVENTOR
NICHOLAS GEORGE
BY

INVENTOR
NICHOLAS GEORGE
BY

INVENTOR
NICHOLAS GEORGE
BY

FULL VIEW HOLOGRAM

The invention described herein was made in the course of work under a contract with the Department of the U.S. Army.

This application is a continuation of application Ser. No. 36,779, filed May 13, 1970, now abandoned.

BACKGROUND OF THE INVENTION

This invention relates to a method and means of making holograms and more particularly to an arrangement for mkaing a holograph recording which provides an almost $4\pi$ stereoradian field of view of an object space.

In order to obtain 360° displays of an object space, using holograms, the prior art has resorted to multiple film displays such as a circular cylindrical film plate surrounding the object, or several plates (at least two) to form portions of a cubical enclosure or a mosaic of separate views side-by-side on a planar emulsion. A simulation of realism would be better served if it were possible to take a single holographic recording, and then have an observer walk around the recording, which is illuminated, and see essentially both sides of an object space, just as if he were walking around the object space itself. Such realism of course is not obtained when the holograms are viewed from one side. When separate holograms are used to form an enclosure, the object size is limited to the enclosure size.

OBJECTS AND SUMMARY OF THE INVENTION

An object of this invention is to provide a method and means of holographic recording whereby a single hologram may be illuminated to display a substantially 360° field of view of an object space.

Yet another object of this invention is the provision of a novel and useful method and means for holographically recording an almost $4\pi$ stereoradian field of view of an arbitrary object on a single film. Two pieces of closely spaced film can also be used, e.g., two pieces which are in contact.

These and other objects of the invention may be achieved in an arrangement wherein a holographic recording is first made on film of one side of an object space. The film is then developed. Thereafter the film is illuminated for the purpose of transferring the recording onto a second film. A proper distance between the first film and the second film is used to allow for propagation effects, i.e., it is placed where the next exposure is to be made.

The film is then exposed to the other side of the object space and a second holographic recording is made thereon. The film is then developed.

Upon illumination, one can walk around the film and observe recreated substantially a $4\pi$ stereoradian field of view of the object space.

Also, in making the hologram, means are described whereby the recreated object (the image position) appears completely on one side or the other of the hologram plate-plane or even the object is partially in front of and partly behind the hologram plane. The position of the image is arbitrary, either in front or behind or split on the hologram plane.

The novel features of the invention are set forth with particularity in the appended claims. The invention will best be understood from the following description when read in conjunction with the accompanying drawings.

BRIEF DESCRIPTION OF THE DRAWINGS

FIGS. 7, 8, 9 and 10 are illustrative of successive steps in making and displaying a third embodiment of the invention.

DESCRIPTION OF THE PREFERRED EMBODIMENTS

Figure 1:
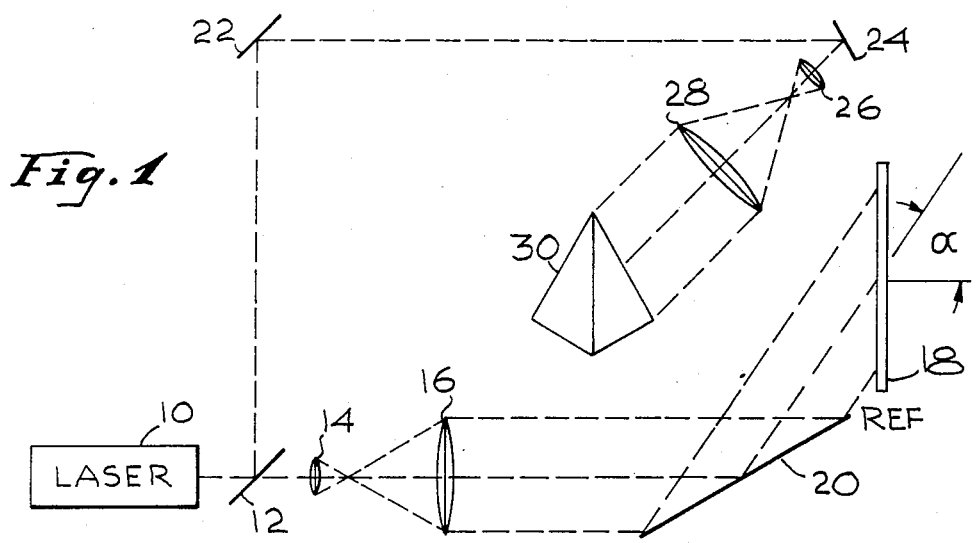
FIGS. 1 through 4 illustrate successive steps in making and displaying a hologram in accordance with this invention.

Referring now to FIG. 1 there may be seen an arrangement for making a hologram, which is known from the prior art, which however, constitutes a first step in making a hologram in accordance with this invention. A coherent light source, such as a laser 10, shines light upon a beam splitter 12. As is well known, this enables a portion of the light to pass therethrough and redirects another portion of the light. It should be noted that the light beam is illustrated as a dotted line.

The light passing through the beam splitter next passes through a lens arrangement known as a beam expander. This comprises two lenses respectively 14, 16, whose function it is to broaden the light beam so that it can cover the desired region, which this case constitutes a sheet of photographic film 18. The film used may be Eastman Kodak type 649–F. A mirror 20 reflects the broadened beam onto the area of the film on which the photographic exposure is to take place. The beam, which passes through the beam splitter 12, is used as the reference beam and it makes some angle $\alpha$ with a perpendicular to the plane of the film 18.

A mirror 22 reflects the portion of the beam, which is reflected by the beam splitter 12. It is reflected onto a mirror 24, which in turn redirects the light beam through a beam expander lens arrangement respectively 26, 28. A light from the beam expander then illuminates the object 30. Light from the object 30 is reflected onto the film 18.

The film 18 is then developed. It constitutes a transmission type hologram of the right hand side of the object space which is made in accordance with the teachings of the prior art. By a transmission recording is meant that in order to view the space image of the object the viewer is on one side of the film and the source of illumination is on the other side of the film.

Figure 2:
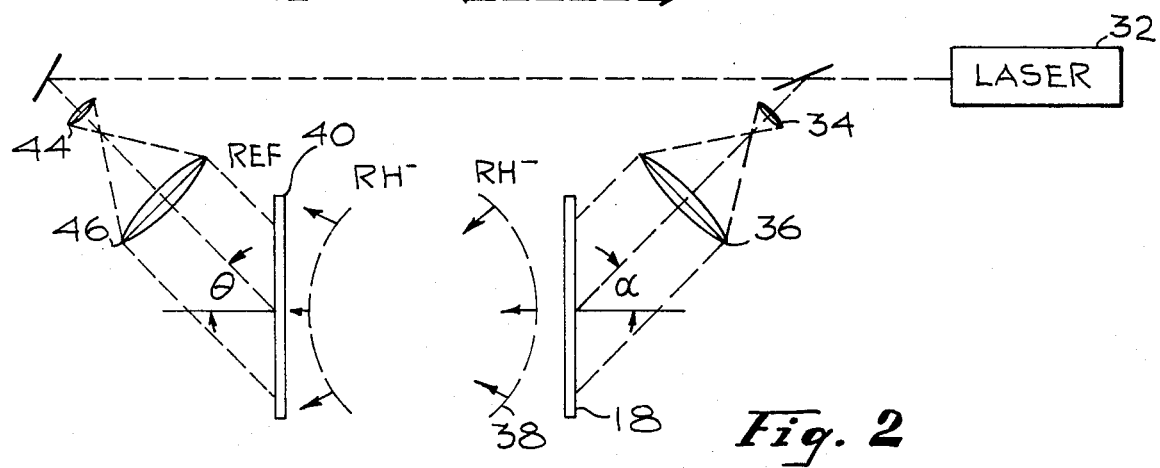

FIG. 2 is a drawing illustrating the next step in making a hologram in accordance with this invention. A laser 32 shines its light through two lenses respectively 34, 36, constituting a beam expander, for illuminating the film 18 with light at the angle $\alpha$. The wavefronts of the light, represented by the dotted semi-circle 38, is then recorded on a photographic film 40. The film 40 is illuminated from its other side by a beam split off from the same laser, the light from which is directed by means of the beam expander lenses 44, 46, at the recording area of the film surface 40, at an angle $\theta$, which is made with the perpendicular passing through the plane of the film. The film 40 is spaced from film 18 a distance to allow for propagation effects; i.e., it is placed where the next exposure is to be made. At this time the film 40 contains a latent image of the right hand objective space. This kind of recording, that is with the reference beam incident on one side of the film and the object beam as shown by RH on the other is known as a reflection recording. This means that the finished film must be viewed with the source of illumination on the same side as the viewer.

Figure 3:
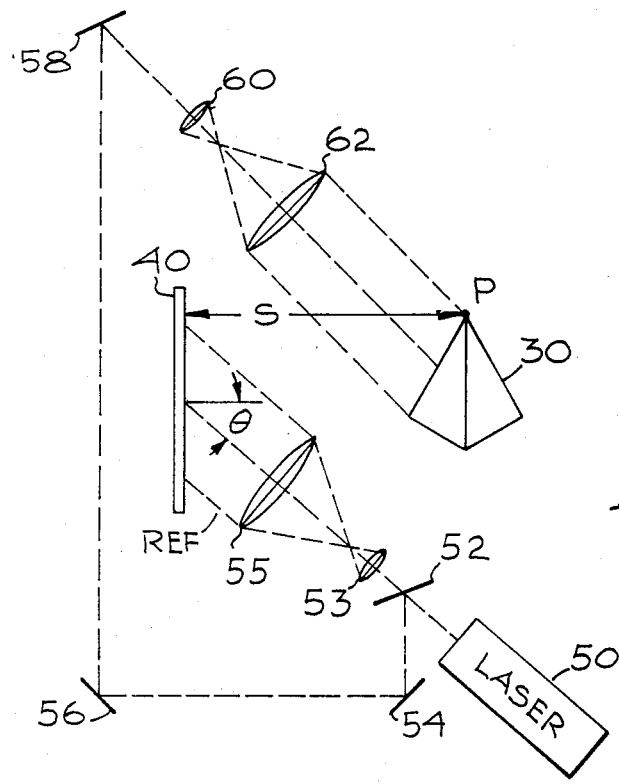

FIG. 3 is the last step in making an embodiment of this invention. This time the object 30 is placed in the same position as it occupied relative to the film 18 in FIG. 1. It is then photographed on the film 40. The indicated photographing technique is known, and produces a transmission recording. Shown in FIG. 3 is a laser light source 50, the light from which is directed at a beam splitter 52. The light passing through the beam splitter is expanded (as before lenses 53, 55) and then illuminates the area of the film 40 and is directed at it with an angle $\theta$, made with the perpendicular passing through the plane of the film. This constitutes the reference light beam. The object illuminating light beam is reflected from the beam splitter 52 onto a first mirror 54, then to a second mirror 56. A third mirror 58, redirects the light beam through the beam expander lenses respectively 60, 62. The light beam then illuminates the left hand side of the object 30. Light reflected from the object 30 is recorded on the film 40. The film is then developed.

Figure 4:
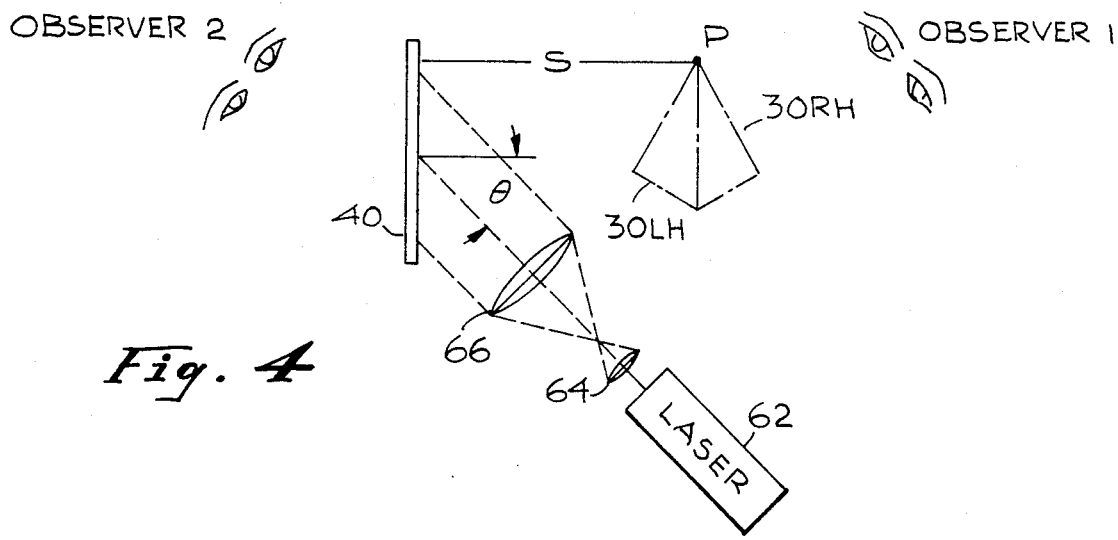
Figure 5:
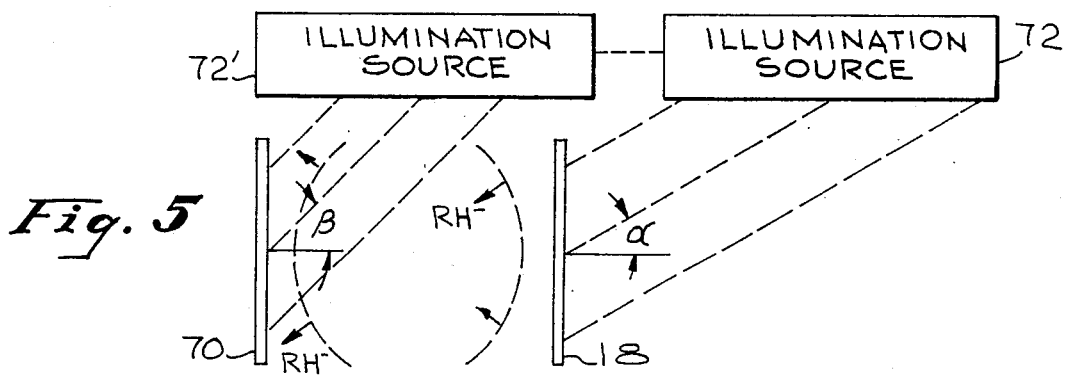
FIGS. 5 and 6 are illustrative of successive steps in making and displaying a second embodiment of this invention.

FIG. 4 illustrates the manner of illumination of the film 40 whereby images of the object 30, respectively designated by 30 LH (left hand) and 30 RH (right hand), are created by illuminating the planar film 40. The illumination is by means of a laser 62, the light from which passes through the beam expander lenses respectively 64, 66 and makes an angle $\theta$ with the perpendicular passing through the plane of the film 40. From any viewing position, an observer sees the image in 3-D at the original position of 30 relative to 40. For example, the apex point P a distance S from the film plate 40 in FIG. 3 appears at S in the reconstruction. Likewise, all other points in the image (reconstructed object) appear in a single undistorted image with their relative spatial positions faithfully reproduced. An observer, observer 1, sees a real image of 30 RH in the neighborhood of P at S to the right of 40; and an observer, observer 2, sees a virtual image of 30 LH in the same neighborhood of P at S to the right of 40.

Since the image of the left hand side of the object space was made by a transmission recording, the transmission recording image of the left hand of the object space will be seen by looking at the film 40 with the light source on the side opposite to that of the viewer. The right hand image of the object space was created by the reflection recording technique, and therefore the light source in the viewer will be on the same side of the film 40. The observer who walks around the film 40 will see almost a $4\pi$ stereoradian (asymptotically) field of view of the object space. If different angles are used $\theta$ in FIG. 2 not equal to $\theta$ in FIG. 3, the dual recording still works but it is necessary to use two sources of illumination in the viewing. As is well known, angle separations can be chosen to minimize spurious images and interaction between the two holograms.

A second embodiment of the invention may be created by first going through the step shown in FIG. 1 of the drawing namely making a transmission recording of the right hand of the object space. Thereafter an image of the developed hologram film 18 is made on a second photographic film 70 which is spaced to the left side of the original object position. The illumination source comprising the laser and expander lenses is represented by the rectangle 72, which illuminates the side of the film 18 which is opposite to the side which was adjacent to the object space. The illumination makes an angle $\alpha$ with the perpendicular through the plane of the film 18. Another beam is split off from the laser source 72, represented as reference Illumination source 72', is expanded thereafter to illuminate the recording area of the film 70, at an angle $\beta$ with a perpendicular to the plane of the film 70, and is positioned on the same side as that which is receiving illumination from film 18. Accordingly, the recording of the right hand side of the object space is a transmission recording.

The next step of the process is the same as that shown in FIG. 3 herein with the object point P at S to the right of 70. A second transmission recording is made on the film 70 of the left hand of the object space. The film 70 is then developed.

Figure 6:
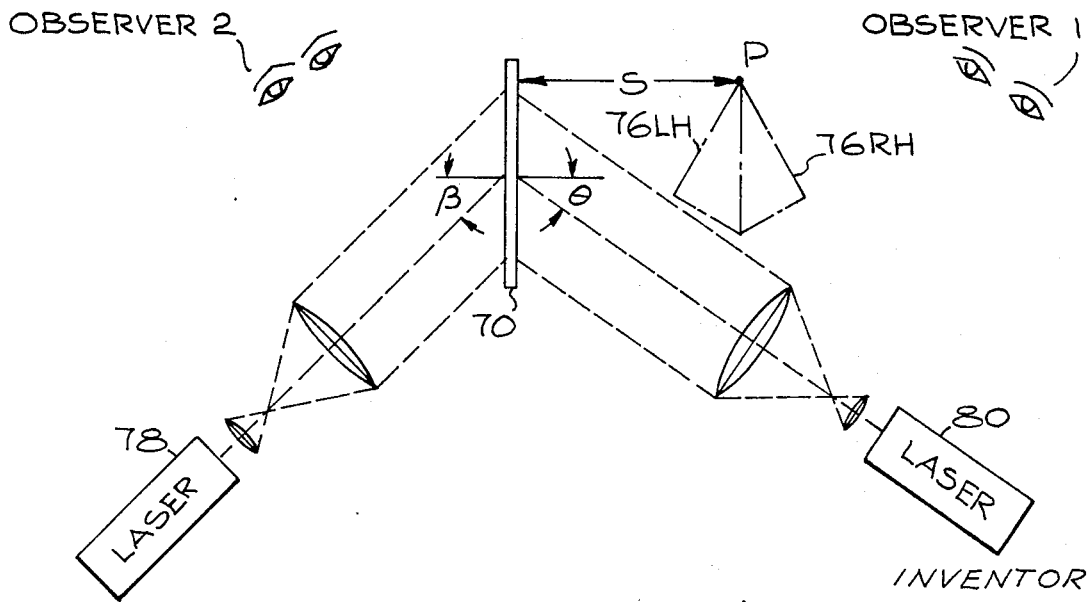

FIG. 6 shows the manner of illuminating the film 70 for recreating the left hand and right hand images respectively 76 LH and 76 RH. The image again appears in 3D with all points in a spatially correct 3D position in a neighborhood to the right of plate 70 as P shown a distance S away. The image 76 RH is observed as a real image by observer 1, in front of plate 70, by virtue of the laser lumination source 78 being placed on the side of the film opposite to the position of the viewer. The recreated image 76 LH is appears behind the plate to observer 2 as a virtual image and is seen by virtue of the laser lumination source 80 being placed on the side of the film opposite to that of the viewer. The film 70 accordingly is a transmission-transmission recording.

FIG. 7 shows an arrangement for making a reflection-reflection hologram in accordance with this invention. A laser illumination source 82 illuminates ann object space 84. A reference illumination source is derived therefrom and illuminates the same side of the film as the side of the object 84, and makes an angle $\alpha$ with the perpendicular to the plane of the film 86. The film 86 is then developed.

The next step of the process is a recording of the image of the film 86 on another film positioned on the other side of the former object position. The next step is similar to that shown in FIG. 2 herein and is shown in FIG. 8. A reflection recording is made on film 90 of the RH recording on film 86, using a laser 83.

FIG. 9 shows the left hand of the object space being recorded on the film 90. The object is illuminated from an illumination source 92. A reference illumination, split off from source 92 illuminates the side of the film 90 opposite to the one on which the object is placed at an angle $\beta$ as shown. The film 90 is then developed.

Figure 10:
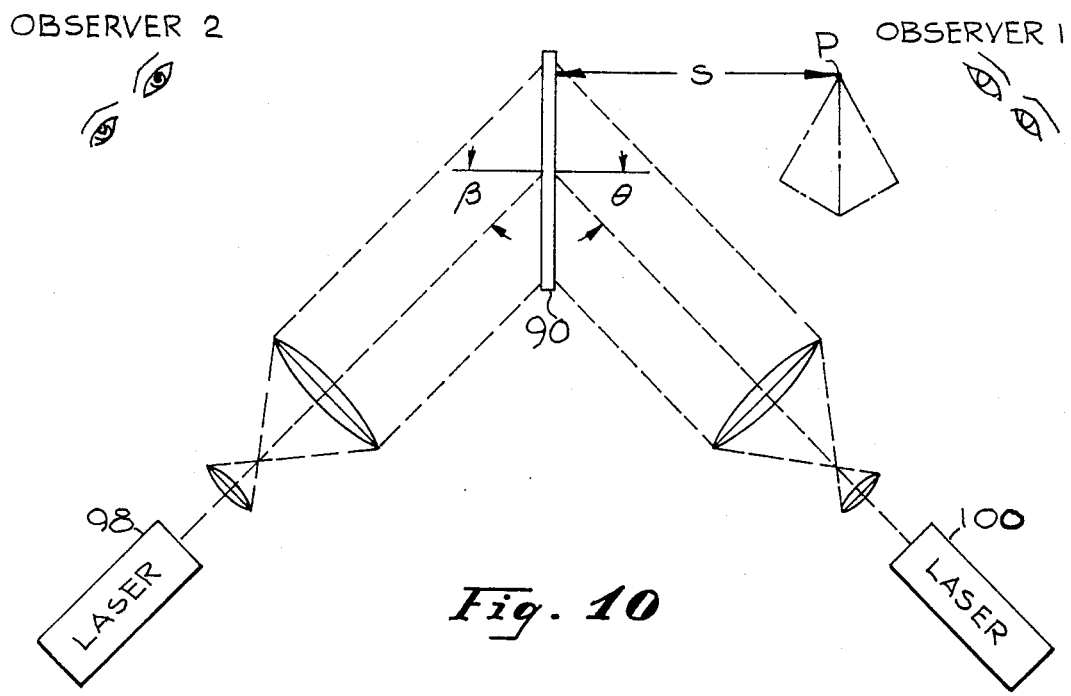

FIG. 10 shows an arrangement for viewing the film 90. Two illumination sources respectively 98, 100 are employed and are positioned on opposite sides of the film 90. The left hand image 96 LH is seen by reflection of light from the source 98 from the film 90 and is seen by an observer 2 as a virtual image behind the plate-point P appears at a distance S to the right of 90.

The right hand image 96 is seen by reflection of the illumination of the source 100 from the film 90 and is seen by observer 2 as a real image at the right of 90. Illumination sources 98 and 100 make angles of $\beta$ and $\theta$, respectively, with the perpendicular through the plane of the film 90. The source illuminations for the reflection-reflection type can be a single laser, two independent lasers or any white light source, such as sunlight or fluorescent or tungsten lamp sources.

While the description of the foregoing invention embodiments proceeds first from a making of the hologram of one-half the object space, then making a recording on a second film of the hologram and thereafter recording the other half of the object space on the second film, it should be appreciated that the order of making these recordings may be reversed and the resulting hologram will be the same. In other words, the order of the steps in making the final hologram is immaterial, as long as these steps are followed.

It should also be noted that two separate holograms, one of the left half object space and the other of the right hand object space may be made and superimposed or glued back to back to provide a $4\pi$ stereoradian hologram in accordance with this invention without departing from the scope or spirit thereof.

It should also be noted that the image position in the reconstruction can be varied with respect to the final hologram. In the examples described previously, point P of the object was always a distance S to the right of the final hologram. An arbitrary spacing, including zero may be obtained for P as follows.

Figure 11:
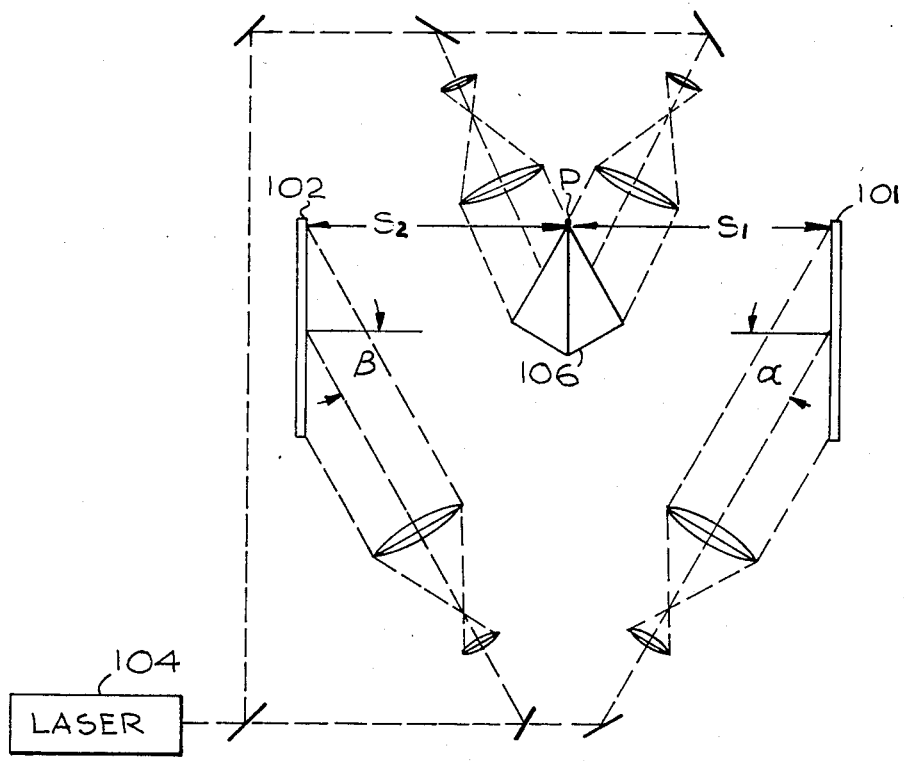
FIGS. 11, 12 and 13 illustrate successive steps in making and displaying a hologram wherein the placement of an object in the recorded object space may be arbitrary.

Referring to FIG. 11, transmission-type holograms 101 and 102 are made with reference beams at angles $\alpha$ and $\beta$, with respect to the normals, respectively, which are derived in well known manner from a laser 104. Point P of the object is distances $S_1$ and $S_2$ from plates 101 and 102 respectively. The plates need not be parallel or be precisely spaced relative to one another. Adequate illumination from the same laser 104 is provided for object 106.

The films are exposed and then developed — with film 101 recording object 106 RH and film 102 recording object 106 LH.

Figure 12:
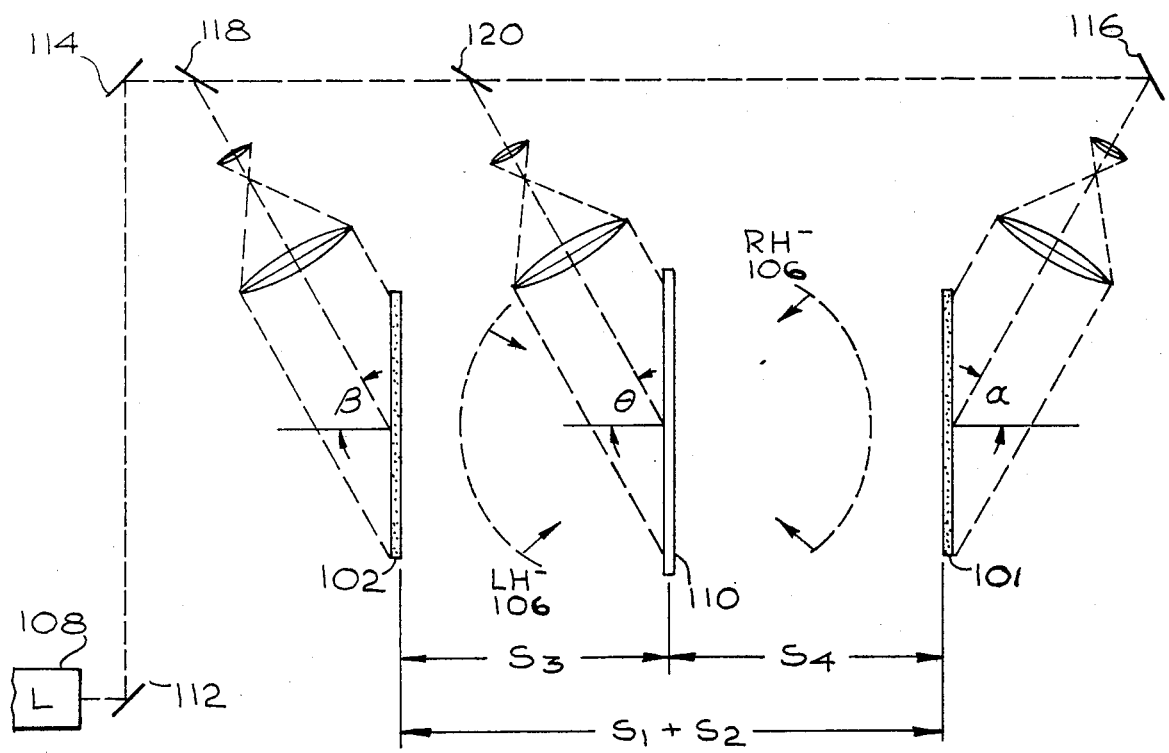

FIG. 12 shows the making of a reflection-transmission type of full-view hologram from plates 101 and 102. The plates 101 and 102 have been returned to their original relative positions, the object is not present, and an unexposed film plate 110 is placed at $S_3$ from plate 102. Again no precise parallelism is required.

A single exposure from laser 108, using three reflectors, 112, 114, 116, and two beam splitters 118, 120 is adequate to record both images on film plate 110.

→ 106 LH from film 102 is tranfered to film 110
→ (Transmission Recording)
→ 106 RH from film 101 transfered to film 110
→ (Reflection Recording)

A double exposure could also be used to do this.

Figure 13:
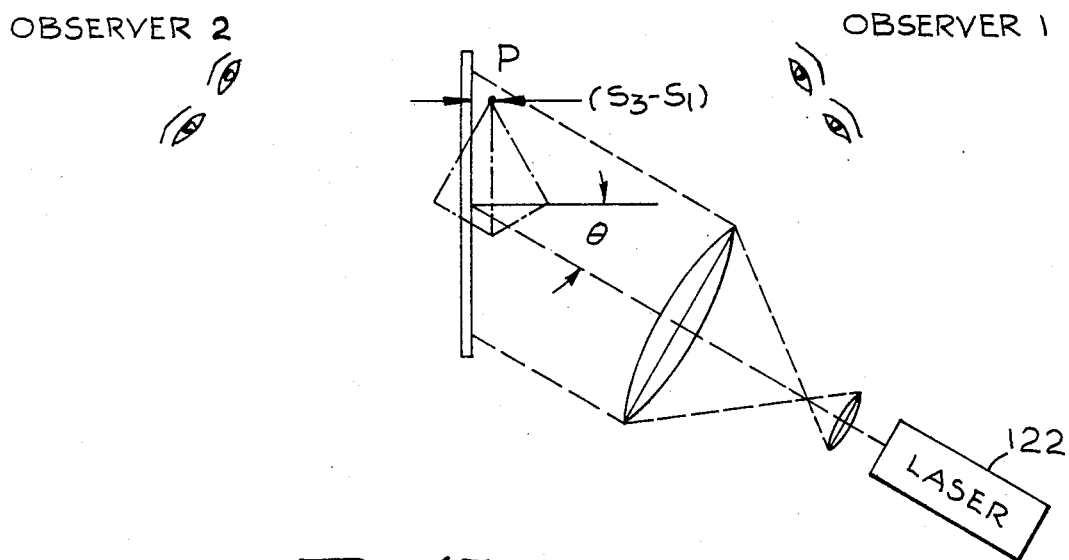

FIG. 13 shows how the film 110 may be viewed. The reflection recording of 106 RH and transmission recording of 106 LH recorded on film 110 may be illuminated by a single illumination beam from a laser 122 making an angle $\theta$ with the normal to the film plane, enables observer 1 to see the object with P at a distance $S_3 - S_1$ to the right of 110. The observer 2 sees the point P in the same position. It is possible to make all three types of full-view helogram with arbitrary placing of P with respect to the hologram.

It is also possible to make a $4\pi$ stereoradian hologram in accordance with this invention by commencing with two holographic stereograms, each one of which is as described in an article entitled holography and stereoscraphy; the holographic stereogram, by Nicholas George and J. T. McCrickerd, published in "Photographic Science and Engineering," Volume 13, No. 6, pages 342–350 November–December 1969. Each of the holographic stereograms is made from an array of photographs, obtained of an object, such as 106 in FIG. 11, taken with the purpose of making a holographic stereogram at position 101 and another holographic stereogram at 102. These holograms are then placed in correct relative spatial position as was described previously in FIG. 11. These holographic stereograms showing an RH and an LH view of an arbitrary object scene are then recorded as a single hologram such as 110. This then constitutes a hologram capable of a 360° reproduction of the object space which had been photographed thereon.

There has accordingly been described and shown herein a novel, useful arrangement for producing a hologram which, upon illumination, produces images of the left hand and right hand field space.

What is claimed is:

1. The method of making a hologram which asymptotically approaches a $4\pi$ steradian hologram of an object space on a single flat sheet, wherein said object space is an imaginary sphere enclosing all objects being recorded, recording on a first sheet of sensitive material the wavefront emanating from substantially one entire half of said object space, placing said first sheet of sensitive material adjacent to and spaced from one side of a second flat sheet of sensitive material, holographically recording on said second sheet of sensitive material the image on said first sheet of sensitive material, holographically recording on a third sheet of sensitive material the wavefront emanating from substantially the other half of said object space, placing said third sensitive sheet adjacent to and spaced from the other side of said second sheet of sensitive material, and holographically recording on said second flat sheet of sensitive material the image on said third sheet of sensitive material, said steps of placing and holographically recording the images on said first and third sheets of sensitive material on said second flat sheet of sensitive material being performed to maintain the relative spatial orientation of said objects space whereby an object within the object space appears to be in the same location when the holograms recorded on said second sheet of sensitive material are viewed from opposite sides thereof.

2. The method of making a hologram which asymptotically approaches a $4\pi$ hologram of an object space on a single flat sheet, wherein said object space comprises an imaginary sphere enclosing all objects whose wavefronts are being recorded, comprising:

holographically recording on a first sheet of sensitive material the wavefront emanating directly from substantially one entire half of said object space, developing the image recorded on said first sheet of sensitive material, holographically recording on a second flat sheet of sensitive material the image recorded on said first sheet of sensitive material, holographically recording on said second flat sheet of sensitive material the wavefront emanating from substantially the other entire half of said object space, and developing said second sheet of sensitive material, said steps of recording on said second sheet of sensitive material being performed such that the relative spatial orientation of the original object space is maintained in the same location when viewed from opposite sides of said second sheet of sensitive material.

3. The method recited in claim 2 wherein said step of holographically recording on a first sheet of sensitive material substantially one entire half wavefront emanating from an object space is a holographic transmission recording, said step of holographically recording on a second sheet of sensitive material the image recorded on said first sheet of sensitive material is a holographic reflection recording, and said step of holographically recording on said second sheet of sensitive material the wavefront emanating from substantially the other entire half of said object space is a holographic transmission recording.

4. The method recited in claim 2 wherein said step of holographically recording on a first sheet of sensitive material of the wavefront emanating from substantially one entire half of an object space is a holographic transmission recording, said step of holographically recording on a second sheet of sensitive material the image recorded on said first sheet of sensitive material is a holographic transmission recording, and said step of holographically recording on said second sheet of sensitive material the wavefront emanating from substantially the other entire half of said object space is a holographic transmission recording.

5. The method recited in claim 2 wherein said step of holographically recording on a first sheet of sensitive material the wavefront emanating from substantially one entire half of an object space is a holographic reflection recording, said step of holographically recording on a second sheet of sensitive material the image recorded on said first sheet of sensitive material is a holographic reflection recording, and said step of holographically recording in said second sheet of sensitive material the wavefront emanating from substantially the other entire half of said object space is a holographic reflection recording.

6. The method of making a hologram which asymptotically approaches a $4\pi$ hologram of an object space on a single planar sheet, wherein said object space is an imaginary sphere enclosing all objects whose wavefronts are being recorded, comprising:

positioning two planar sheets of photographic film on the respective left and right boundaries of said object space, holographically photographing said object space on said two planar sheets, developing the images photographed on said two planar sheets of photographic film repositioning said developed two planar sheets of photographic film at the same positions relative to one another as they were when the object space was photographed, placing a third planar sheet of photographic film between said two developed planar sheets of photographic film, holographically photographing the images on said two developed planar sheets of photographic film in the emulsion of said third planar sheet of photographic film, and developing said third planar sheet of photographic film to provide a $4\pi$ holograph on a single sheet.

7. The product produced by the processes recited in claim 1.

8. The product produced by the processes recited in claim 2.

9. The product produced by the processes recited in claim 6.

* * * * *